(12) United States Patent
Shu et al.

(10) Patent No.: US 6,400,843 B1
(45) Date of Patent: Jun. 4, 2002

(54) COLOR IMAGE REPRODUCTION WITH ACCURATE INSIDE-GAMUT COLORS AND ENHANCED OUTSIDE-GAMUT COLORS

(75) Inventors: Joseph Shu; Tsung-Nan Lin, both of San Jose; Hakan Ancin; Anoop Bhattacharjya, both of Sunnyvale, all of CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/296,891

(22) Filed: Apr. 22, 1999

(51) Int. Cl.[7] .................................................. G06K 9/00
(52) U.S. Cl. ........................ 382/167; 345/590; 358/518
(58) Field of Search ................................. 382/162–167; 358/518, 500, 298, 1–9, 296, 487, 502, 505; 345/440.2, 590, 604, 589, 600; 348/391.1

(56) References Cited

U.S. PATENT DOCUMENTS

| | | | |
|---|---|---|---|
| 5,185,661 A | * 2/1993 | Ng | 358/505 |
| 5,208,911 A | * 5/1993 | Newman et al. | 345/600 |
| 5,231,504 A | * 7/1993 | Magee | 358/500 |
| 5,237,409 A | * 8/1993 | Yamaguchi | 348/391.1 |
| 5,268,754 A | * 12/1993 | Van de Capelle et al. | 382/162 |
| 5,317,648 A | * 5/1994 | Sawada et al. | 382/162 |
| 5,583,666 A | 12/1996 | Ellson et al. | 358/518 |
| 5,596,428 A | 1/1997 | Tytgat et al. | 358/518 |
| 5,610,997 A | * 3/1997 | Ohta et al. | 382/167 |
| 5,617,116 A | 4/1997 | Edgar | 345/440.2 |
| 5,650,942 A | 7/1997 | Granger | 358/500 |
| 5,677,967 A | * 10/1997 | Pariser | 382/167 |
| 5,699,491 A | 12/1997 | Barzel | 358/1.9 |
| 5,721,572 A | 2/1998 | Wan et al. | 345/590 |
| 5,724,442 A | * 3/1998 | Ogatsu et al. | 382/167 |
| 5,724,443 A | * 3/1998 | Nishikiwa | 382/167 |
| 5,731,818 A | 3/1998 | Wan et al. | 345/590 |
| 5,734,745 A | * 3/1998 | Ohneda | 382/167 |
| 5,740,076 A | * 4/1998 | Lindbloom | 382/167 |
| 5,748,329 A | 5/1998 | Chang | 358/298 |
| 5,754,184 A | 5/1998 | Ring et al. | 345/604 |

* cited by examiner

Primary Examiner—Jayanti K. Patel

(57) ABSTRACT

A color image reproduction system achieves higher-quality color reproduction by improving the utilization of colors within the gamut of an output device that are not in the gamut of an input device. This is accomplished by a device-dependent compensation transformation that maps a second set of colors in both the gamut of an input device and the gamut of the output device into a first set of colors in the gamut of the output device but not in the gamut of the input device. The compensation transformation may be derived in a number of ways that entail identifying the first and second sets of colors and then determining one or more scaling factors that map the second set of colors into a union of the first and second sets of colors.

26 Claims, 9 Drawing Sheets

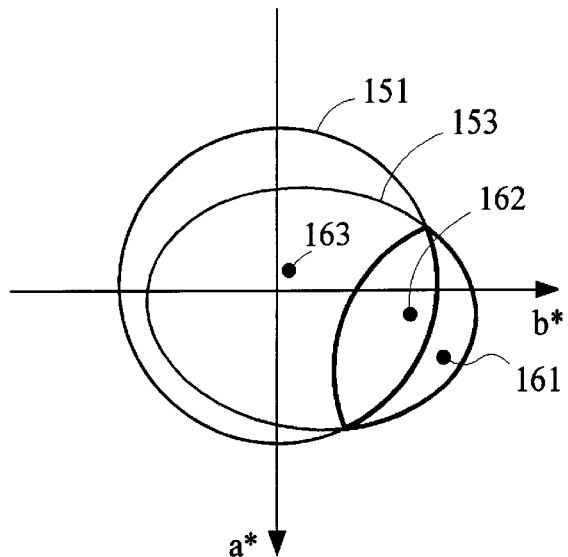 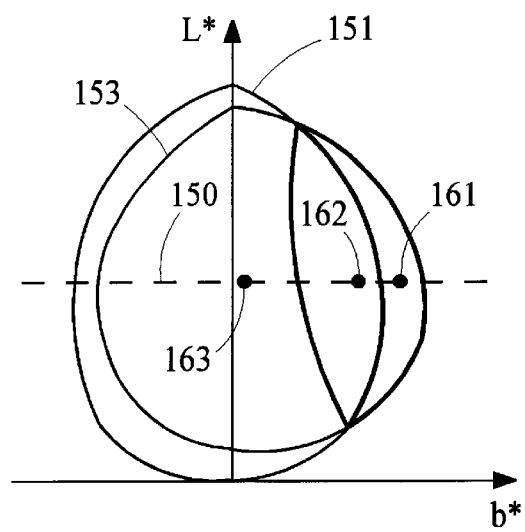
Fig. 12A   Fig. 12B
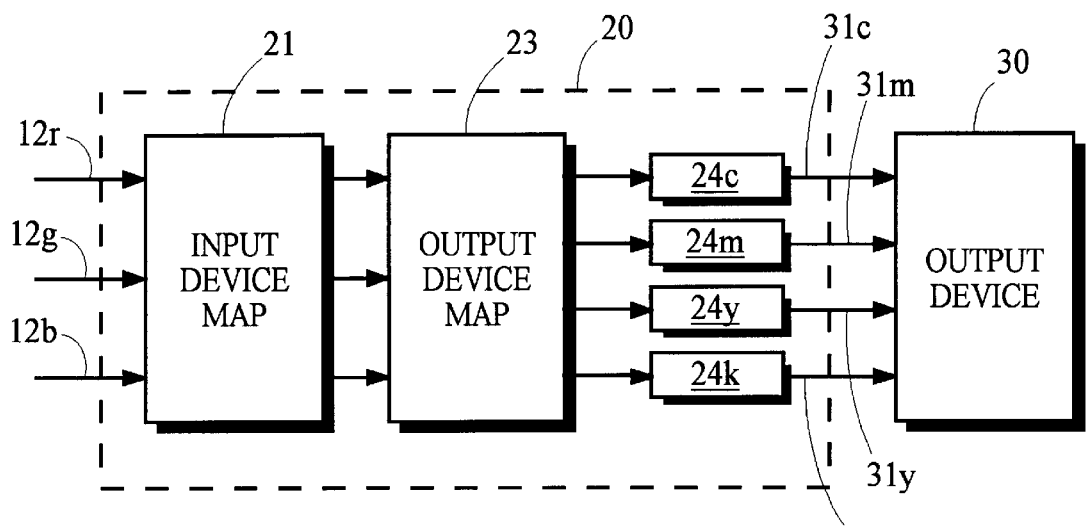
Fig. 13

COLOR IMAGE REPRODUCTION WITH ACCURATE INSIDE-GAMUT COLORS AND ENHANCED OUTSIDE-GAMUT COLORS

TECHNICAL FIELD

The present invention relates generally to color image reproduction systems, and relates more particularly to features that improve color matching between original color images and reproductions of those images.

BACKGROUND ART

Color image reproduction systems typically include an input device for obtaining a representation of an original image, an output device for generating a replica of the image, and a controlling device that processes signals received from the input device to generate new signals sent to the output device to produce the replica, which preferably is a high-fidelity reproduction of the original image. The controlling device may be implemented by a general-purpose computer with appropriate software and/or hardware for peripheral control and signal processing. Examples of input devices include hand held, flatbed and sheet-fed optical scanners and digital cameras for sensing an original image, and a wide range of software and devices for creating an original image. Examples of output devices include ink jet, laser and photolithography printers, electrostatic, flatbed and drum plotters, and video displays such as cathode ray tubes (CRT), thin-film-transistor (TFT) and liquid crystal display (LCD) panels.

Generally, input and output devices use signals that represent the colors as coordinates of points in some device-dependent color space (DDCS). These color spaces may be chosen to provide a convenient expression of color coordinates according to the color-sensing or color-generating process of the particular device. The term "color space" refers to an N-dimensional space in which each point corresponds to a particular color.

One example of a three-dimensional color space is an RGB space in which point coordinates specify particular amounts of red (R), green (G) and blue (B) colorant that additively combine to represent a specific color. The operation of many scanners and video display devices may be conveniently controlled by signals that are specified in an RGB space. One example of a four-dimensional color space is a CMYK space in which point coordinates specify particular amounts of cyan (C), magenta (M), yellow (Y) and black (K) colorant that subtractively combine to represent a specific color. Another example of a three-dimensional color space is a CMY space. The operation of many ink jet and laser printers may be conveniently controlled by signals that are specified in CMYK space or CMY space. Other color spaces that are related to particular devices are also known.

Practical devices are generally capable of sensing or reproducing only a portion of the colors that can be discerned by a human observer. A device "gamut" refers to the colors that can be sensed or reproduced by a particular device. For example, the gamut of a particular scanner refers to the colors that can be sensed by that scanner and the gamut of a particular printer refers to the colors that can be reproduced or printed by that printer.

A scanner gamut is determined by a variety of factors including the spectral response of the optical sensors, the spectral characteristics of color filters, spectral characteristics of the illumination source and the resolution and linearity of analog-to-digital converters.

A printer gamut is determined by a variety of factors including spectral characteristics of colorants such as ink, spectral and porosity characteristics of media such as paper, resolution or dots-per-inch of the printed image, half-toning methods and use of dithering, if any.

A video display gamut is determined by a variety of factors including spectral characteristics of the light emitting material, type of display device, resolution of pixels or video lines, and excitation voltage.

Although it is possible in principle to construct a color image reproduction system by merely connecting an output device directly to an input device, the results would not usually be satisfactory because the DDCS for the input and output devices are generally not the same. A "color-space transformation" can account for different color spaces by mapping the coordinates of colors in one color space to the coordinates of corresponding colors in the other color space. These transformations may be provided by the controlling device, mentioned above. For example, a controlling device performing a color-space transformation that maps color coordinates from the RGB space of a particular scanner into the CMYK space of a particular printer could be used to couple that printer to the scanner by converting the scanner RGB signals into the printer CMYK signals.

Even if the differences between color spaces are accounted for by a color-space transformation, however, the fidelity of the reproduced image as compared to an original image would probably be very poor because the gamut of the input device generally is not co-extensive with the gamut of the output device. For example, the color-space coordinates representing "out-of-gamut" colors that are not in the output-device gamut cannot be reproduced. Instead, some "in-gamut" color within the gamut of the output device must be substituted for each out-of-gamut color. A "gamut-mapping transformation" may be used to substitute an in-gamut color for an out-of-gamut color by mapping the out-of-gamut colors to the substitute colors. The gamut-mapping transformation may also be provided by the controlling device, mentioned above.

In many color image reproduction systems, the gamut-mapping and color-space transformations are integrated and cannot be easily isolated. They may be implemented collectively by one or more transformations according to the needs of the application in which they are used. For ease of discussion, the term "calibration transformation" is used herein to refer to both types of transformations.

Known color image reproduction systems generally implement calibration transformations that map colors between an input-DDCS and an output-DDCS according to only the two transformations described above: (1) a color-space transformation that maps colors in the input-device gamut to the corresponding colors in the output-device gamut, and (2) a gamut-mapping transformation that maps colors in the input-device gamut to substitute colors in the output device gamut. A calibration transformation that maps colors according to only these two transformations may be adequate for systems in which each color within the output-device gamut has a corresponding color in the input-device gamut; i.e., the output-device gamut colors are a subset of the input-device gamut colors. The use of only these two types of transformations is not optimum for systems in which the output-device gamut includes a significant set of colors that are not within the input-device gamut.

DISCLOSURE OF INVENTION

It is an object of the present invention to improve the manner in which colors outside an input-device gamut are mapped to colors within an output-device gamut.

According to the teachings of one aspect of the present invention, a method or apparatus performs a compensation transformation in a color image reproduction system that comprises an input device having an input gamut and an output device having an output gamut by receiving an input signal representing color space coordinates of a first color that is in the input gamut and in the output gamut, and applying the compensation transformation to the input signal to generate an output signal representing color space coordinates of a second color that is in the output gamut but not in the input gamut.

According to the teachings of another aspect of the present invention, a method or apparatus derives a compensation transformation for use in a color image reproduction system that comprises an input device having an input gamut and an output device having an output gamut by identifying a first set of colors that are in the output gamut but are not in the input gamut, identifying a second set of colors that are in the input gamut and in the output gamut, and developing the compensation transformation to enhance chromaticity of colors in the second set of colors by mapping the second set of colors into the first set of colors.

The various features of the present invention and its preferred embodiments may be better understood by referring to the following discussion and the accompanying drawings in which like reference numerals refer to like elements in the several figures. The contents of the following discussion and the drawings are set forth as examples only and should not be understood to represent limitations upon the scope of the present invention.

BRIEF DESCRIPTION OF DRAWINGS

FIGS. 12A and 12B are schematic representations of points and hypothetical gamut boundaries in CIE L*a*b* space and a region of color space that is mapped by a compensation transformation.

FIG. 13 illustrates major components in a color image reproduction system that implements a compensation transformation by one or more scalers.

MODES FOR CARRYING OUT THE INVENTION

A. Color Image Reproduction System

1. Major System Components

Figure 1:
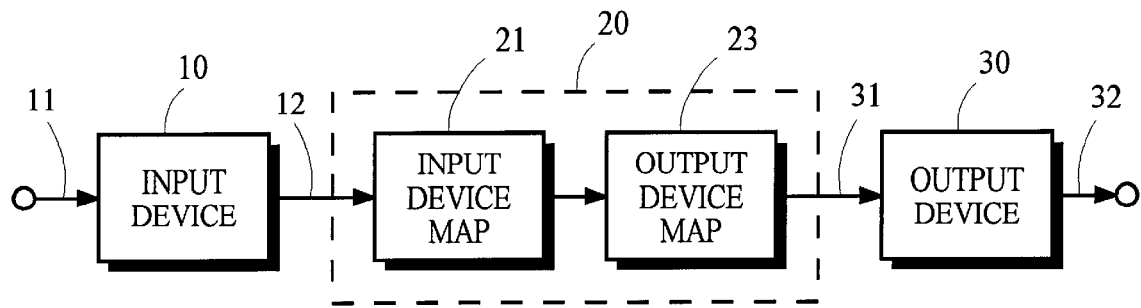
FIG. 1 illustrates major components in a typical color image reproduction system.

FIG. 1 illustrates major components in a typical color image reproduction system. Input device 10 receives from path 11 signals representing an original image and generates along path 12 an input-device-dependent representation of the original image. Controlling device 20 receives this representation from path 12 and, in response, generates along path 31 an output-device-dependent representation of the original image. Output device 30 receives this representation from path 31 and, in response, generates along path 32 a replica of the original image. The present invention is directed toward improving the fidelity with which the replica reproduces the original image.

Input device 10 may be essentially any type of scanner, camera or digital graphics application. If input device 10 is an optical scanner, for example, the signals received from path 11 could be considered to be optical. If input device 10 is an application for creating or manipulating color images, for example, the signals received from path 11 could be considered to represent commands or data. Throughout this disclosure, more particular mention will be made of optical scanners; however, principles and features of the present invention may be applied in systems incorporating other input devices.

Output device 30 may be essentially any type of printer, plotter or display. If output device 30 is an ink-jet printer, for example, the replica generated along path 32 could be considered to be the printed image. If output device 30 is a CRT or TFT display, for example, the replica generated along path 32 could be considered to represent the image formed on the display device. Throughout this disclosure, more particular mention will be made of printers; however, principles and features of the present invention may be applied in systems incorporating other output devices.

By its very nature, the characteristics of the input-device-dependent representation generated along path 12 depends on the characteristics of input device 10. Many optical scanners, for example, generate signals representing colors as points with red (R), green (G) and blue (B) coordinates in an RGB device-dependent color space (DDCS). For ease of discussion herein, the input-DDCS will generally be referred to as RGB space; however, many other color spaces and representations may be used to practice the present invention.

Similarly, the characteristics of the output-device-dependent representation generated along path 31 are chosen to match the characteristics of output device 30. Many color printers, for example, generate images in response to values representing cyan (C), magenta (M), yellow (Y) and black (K) coordinates in a CMYK DDCS. Many devices such as CRT or TFT displays generate images in response to values representing red, green and blue in an RGB DDCS. Because of the device-dependent nature of these color spaces, scanner RGB spaces should not be equated to display RGB spaces. For ease of discussion herein, the output-DDCS will generally be referred to as CMYK space; however, many other color spaces and representations may be used to practice the present invention.

Controlling device 20 is responsible for transforming signals representing the original image in the input-DDCS into signals representing the same image in the output-DDCS. This may be accomplished by using input-device map 21 to implement a calibration transformation that maps the input-DDCS signals into a representation in a device-independent color space (DICS), and using output-device map 23 to implement a calibration transformation that maps the DICS representation into the signals representing the same image in the output-DDCS. Controlling device 20 may include other transformations and processes such as those described herein.

Figure 2:
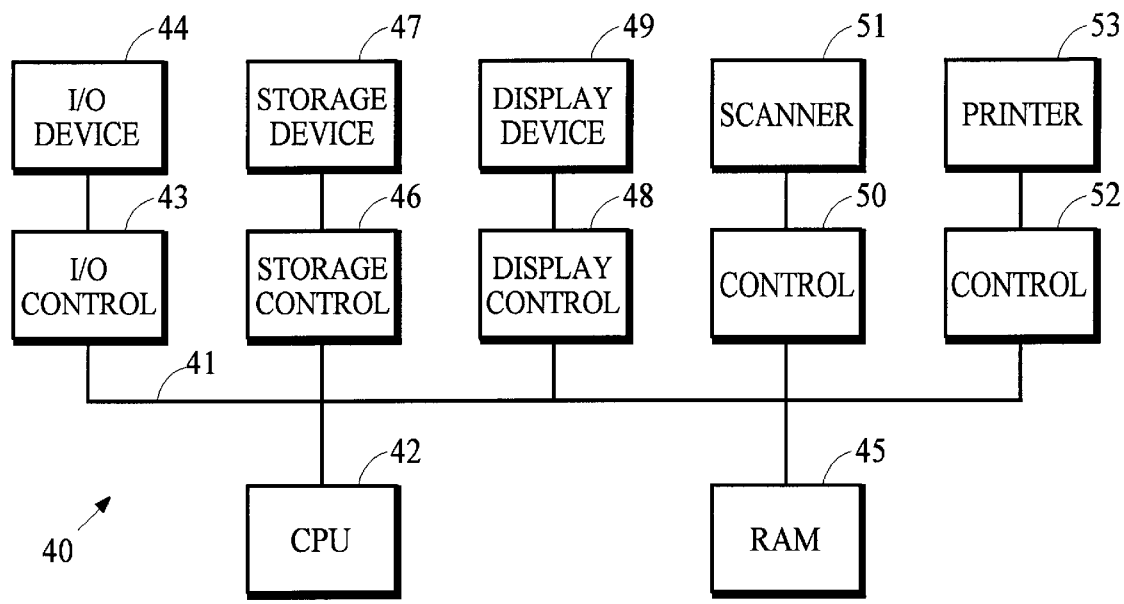
FIG. 2 illustrates major components in a typical personal computer system that may be used to implement various aspects of the present invention.

Controlling device 20 may be implemented by software and/or hardware in a general-purpose computer such as that illustrated in FIG. 2. FIG. 2 illustrates major components in one embodiment of a typical personal computer system 40. CPU 42 provides computing resources. I/O control 43 represents an interface to I/O device 44 such as a keyboard, mouse or modem. RAM 45 is system random access memory. Storage control 46 represents an interface to storage device 47 that includes a storage medium such as magnetic tape or disk, or an optical medium. The storage medium may be used to record programs of instructions for operating systems, utilities and applications, and may include embodiments of programs that implement various aspects of the present invention. Display control 48 provides an interface to display device 49. Control 50 represents an interface to scanner 51 which is an input device like an optical scanner. Control 52 represents an interface to printer 53 which is an output device like an ink jet color printer. Devices like scanner 51 may serve as input device 10 and devices like display device 49 or printer 53 may serve as output device 30.

In the embodiment shown, all major system components connect to bus 41 which may represent more than one physical bus. For example, some personal computers incorporate only a so called Industry Standard Architecture (ISA) bus. Other computers incorporate an ISA bus as well as a higher bandwidth bus conforming to some standard such as the VESA, PCI or AGP bus standards. Preferably, display control 48 connects to a high-bandwidth bus to improve the speed of display. A bus architecture is not required to practice the present invention.

The functions of one or more computer components as well as various aspects of the present invention can be implemented in a wide variety of circuitry including discrete logic components, one or more ASICs and/or program-controlled processors. For example, controlling device 20 may be implemented by a special-purpose device. Alternatively, input-device map 21 and/or output-device map 23 may be implemented separately, perhaps integrated with the respective input/output device to provide a self-calibrated unit. The manner in which controlling device 20 is implemented is not important to the present invention. Other implementations including digital and analog processing circuitry may used.

2. Derivation of Device-Mapping Transformations

Figure 3A:
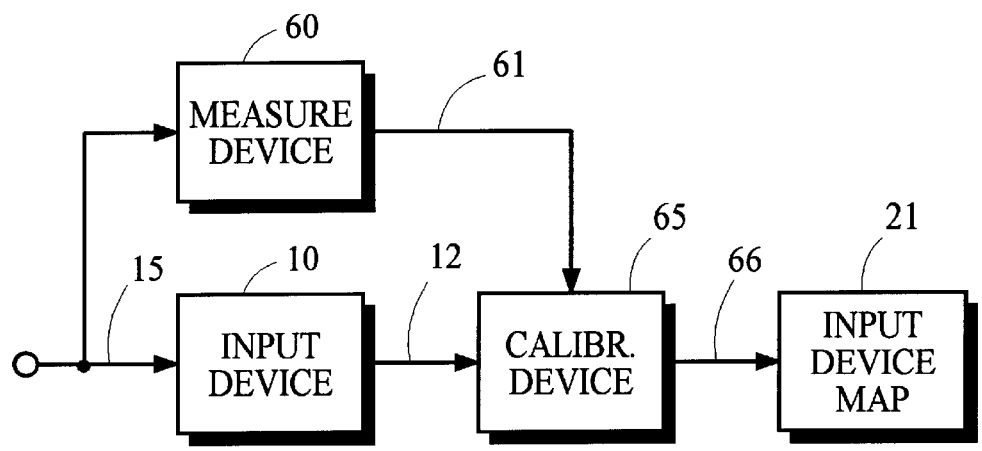
FIGS. 3A and 3B illustrate major components for deriving calibration transformations for input and output devices.
Figure 3B:
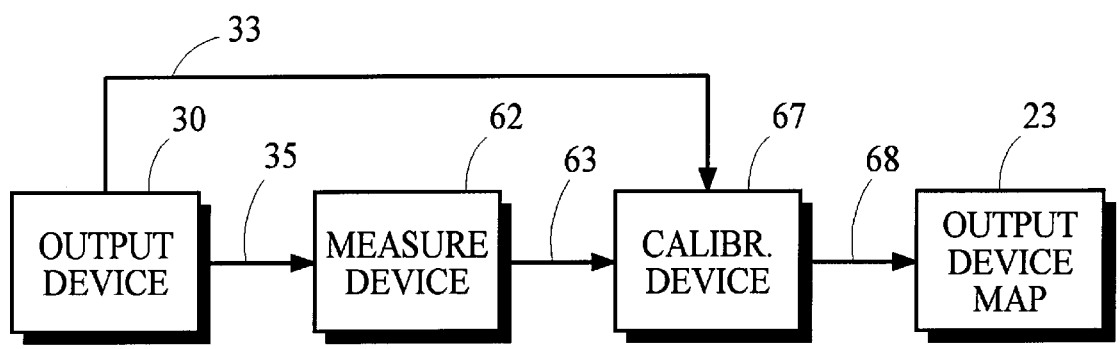

FIGS. 3A and 3B illustrate major components for deriving input-device map 21 and output-device map 23. These illustrations and the following discussion are presented merely as examples to illustrate principles. These maps or calibration transformations may be derived in other ways.

Referring to FIG. 3A, input-device map 21 may be derived by scanning an image 15 that has known color characteristics. For example, image 15 may be one or more sheets of paper with areas or "patches" of known color. The color characteristics of these patches may be determined by a calibrated measure device 60 such as a spectral photometer or colorimeter. According to the technique shown in the figure, measure device 60 scans image 15 and generates signals along path 61 representing the colors of the patches in some DICS such as the Commission International de L'Eclairage (CIE) 1931 XYZ space, referred to herein as CIE XYZ space. Input device 10 scans image 15 and generates signals along path 12 representing the colors of the patches in an input-DDCS such as scanner RGB space.

The device-independent and the device-dependent representations generated 4along paths 61 and 12, respectively, provide selected points in the two color spaces that define a forward transformation $f_I$ representing the way in which input device 10 converts real-world colors into a device-dependent representation. In response to these signals, calibration device 65 derives input-device map 21 that is a calibration transformation $r_I$ from the DDCS to the DICS. For example, if measure device 60 generates values in CIE XYZ space and input device 10 generates signals in some RGB space, then the forward transformation corresponding to input device 10 may be denoted as $f_I$: XYZ→RGB and the calibration transformation corresponding to input-device map 21 may be denoted as $r_I$: RGB→XYZ.

Figure 5A:
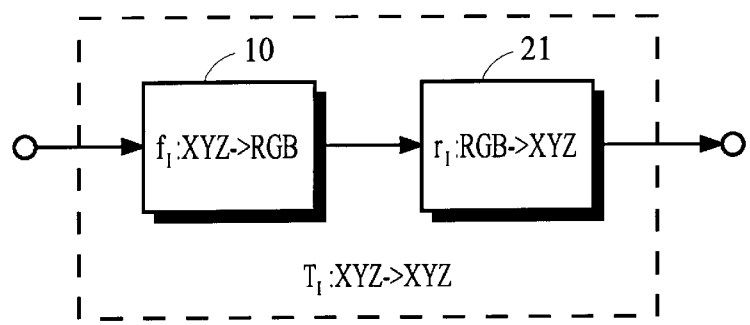
FIGS. 5A through 5C illustrate the end-to-end effects of input or output devices and the system components that implement device calibration transformations.

The way in which these two components work together is illustrated in FIG. 5A. Input device 10 effects a forward transformation $f_I$ on values representing real-world colors to obtain values in some input-DDCS. It is often convenient to represent real-world colors in some DICS such as CIE XYZ space. The forward transformation may then be expressed as a mapping from CIE XYZ space to some input-DDCS such as an RGB space as described above. Input-device map 21 effects a calibration transformation $r_I$ on the values in the input-DDCS to obtain mapped values in some DICS such as CIE XYZ space. The end-to-end effects of these two components is to effect a composite transformation from one DICS to another DICS. According to the example discussed above and illustrated in the figure, the composite transformation is, in principle, similar to the identity matrix that maps from CIE XYZ space to CIE XYZ space, which may be denoted as $T_I$: XYZ→XYZ. In practice, however, calibration transformation $r_I$ is only an approximation of the desired inverse of forward transformation $f_I$. Arithmetic round off errors and errors in the calibration transformation introduce inaccuracies into the composite transformation.

Referring to FIG. 3B, output-device map 23 may be derived by using output device 30 to generate image 35 and determining the color characteristics of image 35. For example, image 35 may be one or more sheets of paper with patches that are analyzed by a calibrated measure device 62 such as a spectral photometer or colorimeter. According to the technique shown in the figure, measure device 62 scans image 35 and generates signals along path 63 representing the colors of the patches in some DICS such as CIE XYZ or CIE L*a*b* space. Output device 30 or some component controlling output device 30 generates signals along path 33 representing the patches in some output-DDCS such as printer CMYK space.

The device-independent and the device-dependent representations generated along paths 63 and 33, respectively, provide selected points in the two color spaces that define a forward transformation $f_O$ representing the way in which output device 30 converts the device-dependent representation into real-world colors. From these signals, calibration device 67 derives output-device map 23 that is a calibration transformation $r_O$ from the DICS to the DDCS. For example, if measure device 62 generates values in CIE L*a*b* space and output device 30 generates the image in response to signals in some CMYK space, then the forward transformation corresponding to output device 30 may be denoted as $f_O$: CMYK→L*a*b* and the calibration transformation corresponding to output-device map 23 may be denoted as $r_O$: L*a*b*→CMYK.

Calibration transformations from CIE L*a*b* color space are convenient choices in many practical embodiments because they often facilitate good quality mappings of colors outside the gamut of the output device to colors that are inside the gamut. If a calibration transformation $r_O$ that maps from CIE L*a*b* space is desired, it is not essential that measuring device 62 used to derive the transformation actually generates values in L*a*b* space. For example, a measuring device that generates values in CIE XYZ space may be used instead. The corresponding values in CIE L*a*b* space that are needed for the derivation can be obtained precisely from the XYZ values using a set of analytical expressions described below.

Figure 5B:
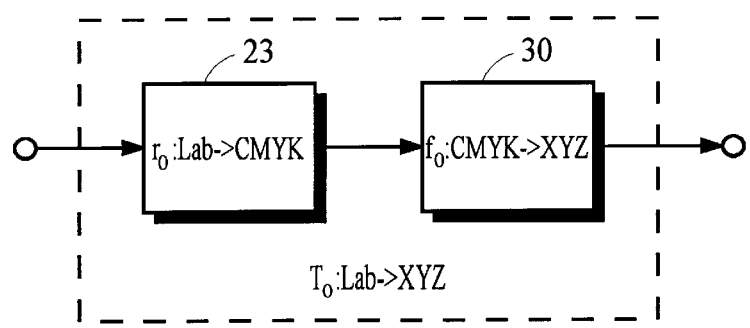

The way in which device map 23 and output device 30 work together is illustrated in FIG. 5B. Output-device map 23 effects a calibration transformation $r_O$ on values representing colors in some DICS to obtain values in some output-DDCS. Output device 30 effects a forward transformation $f_O$ on the values in the output-DDCS to obtain a replica image with real-world colors. Essentially any color space may be chosen to express the real-world colors of original and replica images. Conceptually, however, it is helpful to express these colors in a common DICS. When the colors of the two images are expressed in the same color space, an ideal color image reproduction system is equivalent to an identity mapping from the input-DICS to the output-DICS. For example, if the real-world colors are expressed in some DICS such as CIE XYZ space, the forward transformation $f_O$ may then be expressed as a mapping from the output-DDCS to CIE XYZ. The output-DICS may be chosen independently of the color space from which the calibration transformation $r_O$ maps color values. In the example described above, the calibration transformation maps from CIE L*a*b* space.

The end-to-end effects of device map 23 and output device 30 is to effect a composite transformation from one DICS to another DICS. According to the example discussed above and illustrated in the figure, the composite transformation maps from CIE L*a*b* space to CIE XYZ space, which may be denoted as $T_O$: L*a*b*→XYZ. In practice, the overall effect of these two transformations is not perfect because calibration transformation $r_O$ is only an approximation of the desired inverse of forward transformation $f_O$. Arithmetic round off errors and errors in the calibration transformation introduce inaccuracies into the composite transformation.

3. Implementation of Device-Mapping Transformations

A transformation between two arbitrary color spaces usually cannot be expressed in a closed or analytical form; therefore, these transformations are often implemented by a look-up table (LUT) and multi-dimensional interpolation. Each entry in the LUT contains coordinates of a specific point in the first color space and coordinates of the corresponding point in the second color space. For any arbitrary point in the first color space, the coordinates of the corresponding point in the second color space can be approximated by interpolating coordinates of selected table entries. Trilinear, prism, pyramidal and tetrahedral interpolation techniques and a number variations of such techniques are known; however, some form of tetrahedral interpolation is generally preferred.

According to tetrahedral interpolation, the LUT is searched to find entries representing points in the first color space that define the vertices of the smallest tetrahedron that encloses the arbitrary point. Interpolation coefficients are calculated based on the relative position of the arbitrary point with respect to the four vertices. Finally, an approximation of the mapped point is obtained by using the interpolation coefficients to form a linear combination of the coordinates in the second color space that correspond to the four vertices. This linear combination may be represented as:

$$x_P = a_1 x_1 + a_2 x_2 + a_3 x_3 + a_4 x_4$$

$$y_P = a_1 y_1 + a_2 y_2 + a_3 y_3 + a_4 y_4$$

$$z_P = a_1 z_1 + a_2 z_2 + a_3 z_3 + a_4 z_4$$

where $x_P$=the point in second color space corresponding to the arbitrary point, $a_1$ through $a_4$ are the coefficients of interpolation,
$(x_1, y_1, z_1)$=coordinates of vertex 1 in the second color space,
$(x_2, y_2, z_2)$=coordinates of vertex 2 in the second color space,
$(x_3, y_3, z_3)$=coordinates of vertex 3 in the second color space, and
$(x_4, y_4, z_4)$=coordinates of vertex 4 in the second color space.

Additional information regarding various forms of interpolation may be obtained from H. R. Kang, "Color Technology for Electronic Imaging Devices," SPIE Optical Engineering Press, 1997, pp. 64–101, 141–152 and 248–251, which is incorporated herein by reference.

Figure 4A:
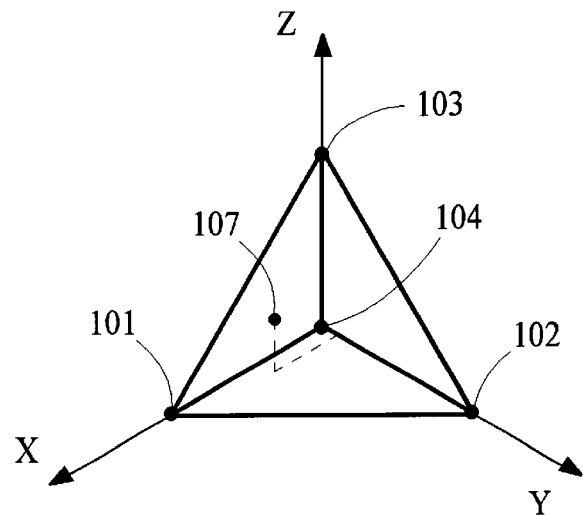
FIGS. 4A and 4B are schematic representations of points and regions in color spaces, particularly corresponding points and regions in CIE XYZ space and CIE L*a*b* space.
Figure 4B:
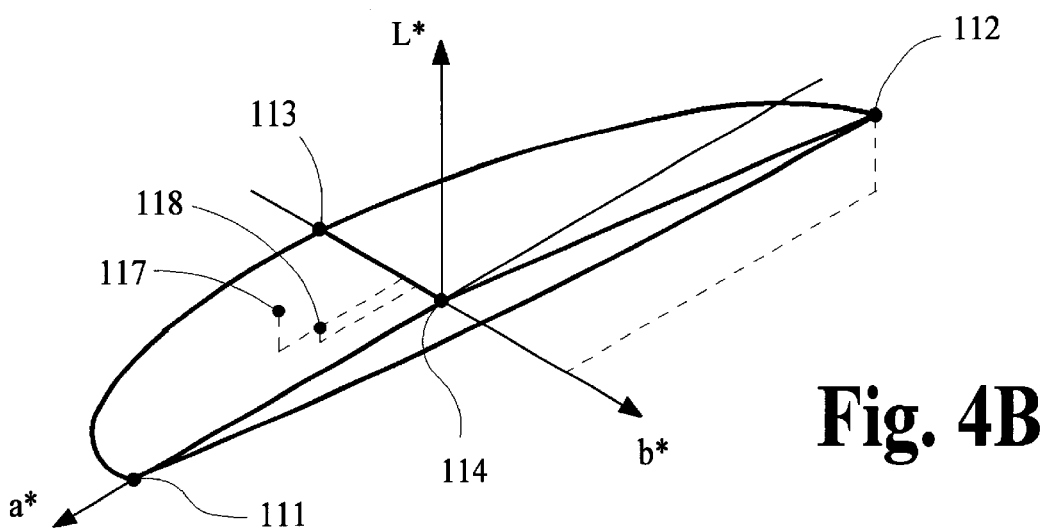

An implementation of a calibration transformation by a linear interpolation LUT generally cannot be perfectly accurate because the desired transformation is highly non-linear. The non-linearity of transformations between typical color spaces is shown in FIGS. 4A and 4B. These figures illustrate points and regions in CIE XYZ space and CIE L*a*b* space that correspond to each other according to a known analytical relationship, discussed more fully below. These illustrations are useful to illustrate principles of a mapping transformation between two arbitrary color spaces for which an analytical relationship is not known. As shown in the figures, points 101–104 in a first color space correspond to points 111–114, respectively, in a second color space. The points along the four straight-line segments connecting these references points in the color space of FIG. 4A correspond to points along the curved and straight-line segments connecting the referenced points in the color space of FIG. 4B.

The transformation from CIE XYZ space into CIE L*a*b* space can be expressed by a set of analytical expressions. Although such analytical expressions are not available for many color space mappings, this particular mapping is useful to illustrate the inaccuracy of interpolation.

A point in CIE XYZ space may be mapped into CIE L*a*b* space by the following non-linear equations:

$$L^* = 116\, m(y/y_o) - 16$$

$$a^* = 500\, [m(x/x_o) - m(y/y_o)]$$

$$b^* = 500\, [m(y/y_o) - m(z/z_o)]$$

where x,y,z=coordinates in CIE XYZ space, $x_o,y_o,z_o$= maximum vlaue for the coordinates in CIE XYZ space, $$m(t) = t^{1/3} \quad \text{if } 0.008856 < t \le 1, \text{ and}$$

$$m(t) = 7.787t + (16/116) \quad \text{if } 0 \le t < 0.008856$$

for the independent variable t.

Referring to FIGS. 4A and 4B, point 107 represents a color in CIE XYZ space. By applying the three analytical expressions discussed above to the coordinates of point 107, an exact mapping for point 107 in CIE L*a*b* space can be obtained. This exact mapping is shown as point 117.

If the transformation is performed by interpolation, however, the mapping is not exact. Referring to FIG. 4A, point 107 in XYZ color space is shown to be within a tetrahedron that has vertices at points 101–104. By applying tetrahedral interpolation to corresponding points 111–114 in L*a*b* space according to the relative position of point 107 with respect to the tetrahedral vertices in XYZ space, an approximate position can be obtained for the corresponding point in L*a*b* space. This approximate location is illustrated as point 118. The distance between points 117 and 118 represents the interpolation error.

The particular mapping relationship shown in FIGS. 4A and 4B is pertinent to many embodiments of systems that incorporate scanners and printers using two DICS. In particular, many embodiments map scanner signals into CIE XYZ space and map printer signals from CIE L*a*b* space. It is, therefore, necessary in these embodiments to provide a map or transformation from CIE XYZ to CIE L*a*b* space as shown in the figures. This transformation may be denoted $T_T$: XYZ→L*a*b*. As mentioned above, this transformation is illustrated graphically in FIGS. 4A and 4B. In such embodiments, controlling device 20 converts signals received from path 12 into signals generated along path 31 according to a transformation $T_C$ that is equivalent to a cascaded application of the transformations discussed above, denoted here as $T_C = r_I \cdot T_T \cdot r_O$, or $T_C$: RGB→CMYK= $r_I$: RGB→XYZ·$T_T$: XYZ→L*a*b*·$r_O$: L*a*b*→CMYK.

Figure 5C:
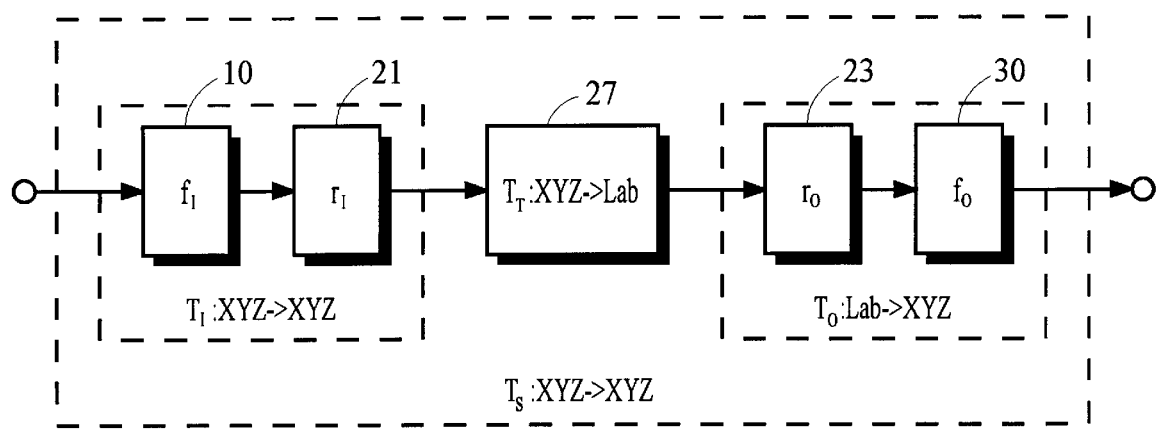

The effect of the $T_T$ transformation in conjunction with the other transformations is illustrated in FIG. 5C. As explained above, input device 10 and input-device map 21 effect a transformation from one DICS to another DICS such as from CIE XYZ space to CIE XYZ space, denoted as $T_I$: XYZ→XYZ. Output-device map 23 and output device 30 effect a transformation from one DICS to another DICS such as from CIE L*a*b* space to CIE XYZ space, denoted as $T_O$: L*a*b*→XYZ. By effecting a transformation from CIE XYZ space to CIE L*a*b* space, the $T_T$ transformation provides the link required to couple the $T_I$ and the $T_O$ transformations together.

The end-to-end effect of these coupled transformations represents the overall operation of the color image reproduction system. According to the example discussed above and illustrated in the figure, this end-to-end effect is a mapping $T_S$ from CIE XYZ space to CIE XYZ space, which is equivalent in principle to an identity transformation. In absence of arithmetic round off errors and or other computational errors in the component transformations, the color image reproduction system is a transparent system that is able to reproduce an original image perfectly.

The accuracy of the calibration transformations affects the reproduction accuracy of colors that are in the input-device gamut and the output-device gamut. Unfortunately, even if the calibration transformations rF and ro are perfectly accurate inverses of the input and output device color mappings, practical color image reproduction systems do not reproduce all colors perfectly because input and output devices have limited gamuts that are generally not coextensive.

B. Gamut Mapping

Input and output devices are capable of sensing or reproducing only a portion of the colors that can be discerned by a human observer. The gamut of a scanner, for example, refers to the colors that can be sensed by that scanner. The gamut of a printer refers to the colors that can be generated by that printer. The colors that can be reproduced are referred to as "in gamut" colors and the colors that cannot be reproduced are referred to as "out-of-gamut" colors.

Color-space transformations may be used to map a color that is within an input-device gamut and has a corresponding color within an output-device gamut. In this context, the term "corresponding" refers to counterpart colors in the color spaces of the two devices. A color-space transformation is suitable because the desired transformation is merely a mapping from a particular color in one color space to the corresponding color in another color space. If the two color spaces are identical, the color-space transformation is equivalent in principle to an identity transformation.

Color-space transformations generally are not suitable to map a color within an input-device gamut that does not have a corresponding color within an output-device gamut. Instead, some form of gamut-mapping transformation may be used to map such a color in one color space to a substitute color in another color space.

1. Gamut Representations

Figure 6:
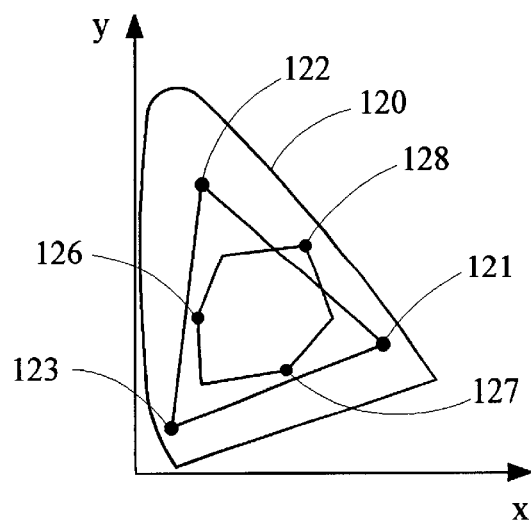
FIG. 6 is a schematic representation of two hypothetical gamuts within a two-dimensional projection of a normalized color space.

FIG. 6 is a schematic representation of two hypothetical device gamuts. Closed contour 120 represents a two-dimensional projection of a normalized color space, such as the CIE xy chromaticity diagram, that represents the chromaticity of the visible spectrum. Colors are plotted in the diagram according to wavelength. The shortest wavelengths appear in the lower-left region within contour 120 and the longest wavelengths appear in the lower-right region within contour 120.

The triangle with vertices at points 121–123 represents a device gamut that is typically represented in an RGB space; however, as shown, the boundary of this gamut is plotted in CIE xy space. Vertex 121 represents the extent to which the gamut includes colors in the red portion of the spectrum. The vertices at points 122 and 123 represent the extent to which this gamut includes colors in the green and blue portions of the spectrum, respectively. Ignoring granularity due to the discrete nature of digital devices, a device having this gamut is capable of reproducing all of the colors inside this triangle.

Similarly, the hexagon with three of its vertices at points 126–128 represents a device gamut that is typically represented in CMY space; however, as shown, the boundary of this gamut is plotted in CIE xy space. The vertices at points 126–128 correspond to colors in the cyan, magenta and yellow portions of the spectrum, respectively. Ignoring granularity due to digital implementations, a device having this gamut is capable of reproducing all colors included within the hexagon. In the example shown, the hexagonal-shaped gamut is generally contained within the triangular-shaped gamut but includes a set of colors in the yellow portion of the spectrum that are not included within the triangular-shaped gamut.

Figure 7A:
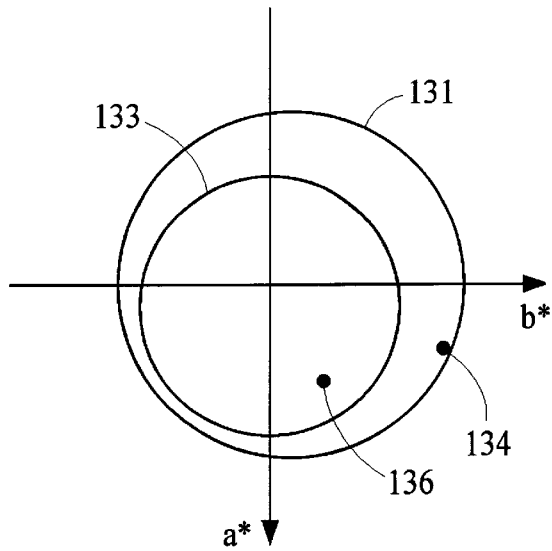
FIGS. 7A and 7B are schematic representations of points and hypothetical gamut boundaries in CIE L*a*b* space.
Figure 7B:
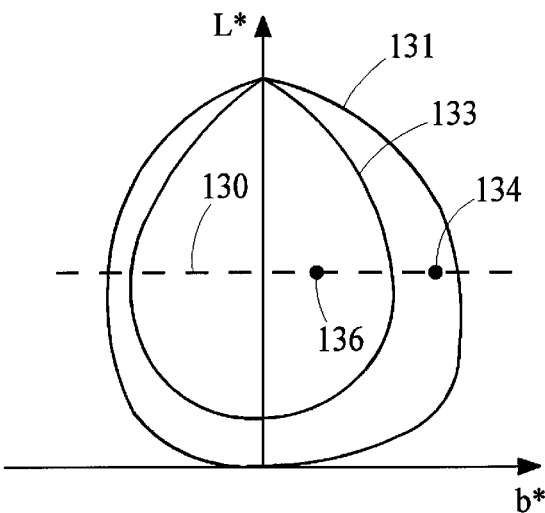

FIGS. 7A and 7B are schematic representations of points and hypothetical gamut boundaries in CIE L*a*b* space. The L* coordinate represents luminance or brightness and the a* and b* coordinates represent hue and chromaticity. Points having the same L* coordinate have the same luminance and points having the same angle with respect to the a* and b* axes have the same hue. The distance between a point and the L* axis is a measure of chroma magnitude or chromaticity. Points along the L* axis represent shades of gray from black to white, which are neutral in color.

FIG. 7A illustrates two hypothetical gamuts 131 and 133 in L*a*b* color space as viewed along the L* axis. FIG. 7B illustrates gamuts 131 and 133 as viewed along the a* axis. The gamut boundaries shown in FIG. 7A as well as in other figures are intended to provide simple illustrations suitable for understanding principles of the present invention. They are not intended to represent the boundaries of gamuts for actual devices which are generally more complex.

Circles 131 and 133 shown in FIG. 7A illustrate the locus of points in plane 130 at the boundaries of the two gamuts. Point 134 is inside gamut 131 but outside gamut 133. Point 136 is inside both gamuts. As may be seen from the two figures, the colors included in gamut 133 form a proper subset of the colors included in gamut 131. The gamut of a typical scanner often includes a larger set of colors than does the gamut of a typical printer. One suitable gamut-mapping technique for this situation is discussed next.

2. Mapping Output-Device Out-of-Gamut Colors

One type of gamut mapping may be used to map a first color within an input-device gamut to a substitute second color that is on the boundary of the output-device gamut. This mapping essentially projects the first color onto the line in color space representing neutral (gray) colors and clips the projection at the output-device gamut boundary.

Figure 8A:
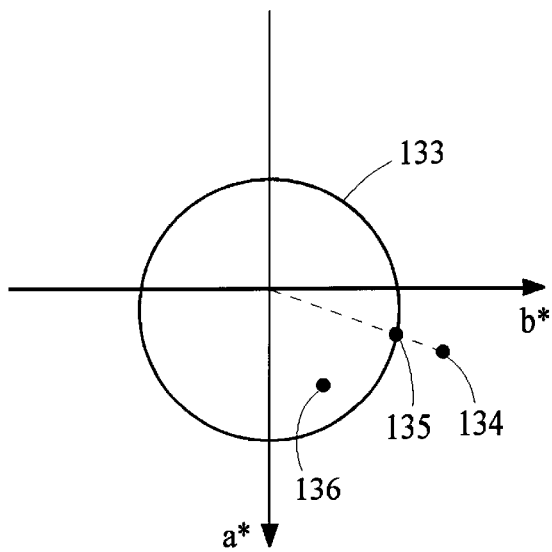
FIGS. 8A and 8B are schematic representations of points and transformational mappings onto the boundary of a hypothetical gamut in CIE L*a*b* space.

This particular mapping can be performed conveniently in CIE L*a*b* space where points on the L* axis represent neutral colors. Referring to FIG. 8A, the color represented by point 134 is mapped to the color represented by point 135 on the boundary of gamut 133 by projecting a line from point 134 to the L* axis and finding the intersection of the projection with the boundary. If possible, the projection is orthogonal to the L* axis so that the luminance level is preserved.

Figure 8B:
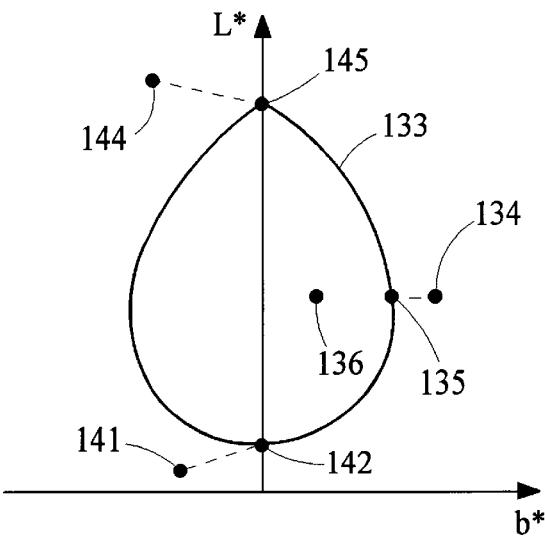

An orthogonal projection to the L* axis is not always possible. Referring to FIG. 8B, the colors represented by points 141 and 144 have luminance levels that lie outside gamut 133. The projection from point 141 is made to point 142, which represents the minimum value for L* in gamut 133 along the neutral-color line. The projection from point 144 is made to point 145, which represents the maximum value for L* in gamut 133 along the neutral-color line.

This mapping may be performed in other color spaces. For example, in CIE XYZ space, the points of neutral color define a line for which $x/x_0 = y/y_0 = z/z_0$, where $(x_0, y_0, z_0)$ specifies normalization coordinates for the color space. An out-of-gamut color may be mapped to the intersection of the gamut boundary with a curve connecting the point to this line. The curve corresponds to the orthogonal projection in L*a*b* space that preserves luminance. Alternatively, a straight-line projection or some other curve can be used in XYZ space, which will provide a different result.

Other types of gamut mapping for output-device out-of-gamut colors are known.

3. Mapping Input-Device Out-of-Gamut Colors

It is not uncommon for an output device like a printer to have a gamut including some colors that are outside the gamut of an input device like a scanner. The situation is illustrated in FIGS. 9A and 9B, which are schematic representations of points and hypothetical gamut boundaries in CIE L*a*b* space.

Figures 9A, 9B:
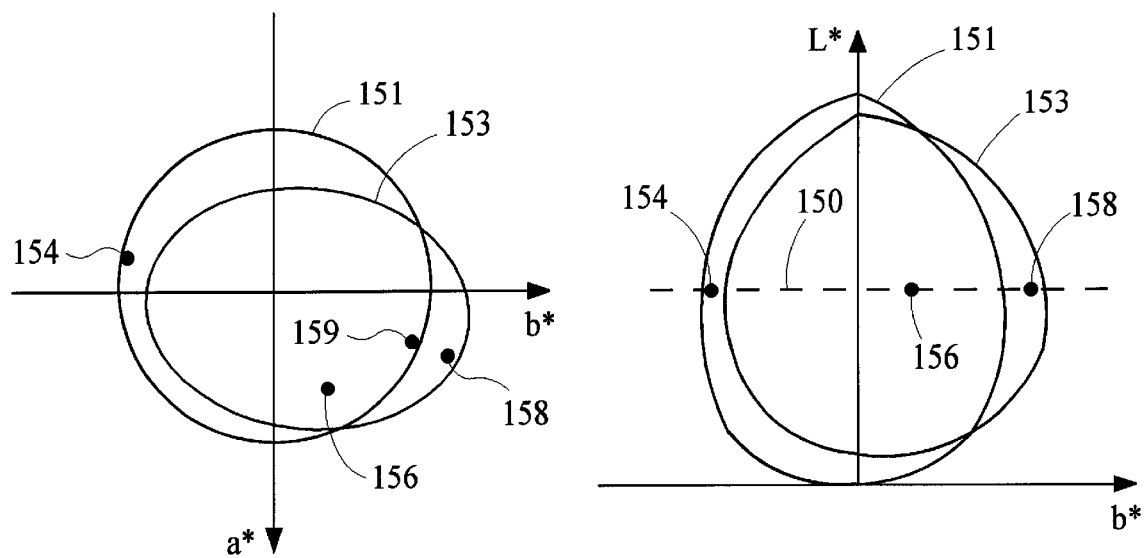
FIGS. 9A and 9B are schematic representations of points and hypothetical gamut boundaries in CIE L*a*b* space.

FIG. 9A illustrates two hypothetical gamuts 151 and 153 in L*a*b* color space as viewed along the L* axis. FIG. 9B illustrates gamuts 151 and 153 as viewed along the a* axis. Closed curves 151 and 153 shown in FIG. 9A illustrate the locus of points in plane 150 at the boundaries of the two gamuts. Gamut 151 represents the gamut of a hypothetical scanner and gamut 153 represents the gamut of a hypothetical printer. Point 154 is inside scanner gamut 151 but outside printer gamut 153. Point 158 is inside printer gamut 153 but is outside scanner gamut 151. Point 156 is inside both gamuts. In the example shown in the figures, scanner gamut 151 includes a set of colors that printer gamut 153 does not include and printer gamut 153 includes a set of colors that scanner gamut 151 does not include.

Color-space transformations may be used to map colors like that for point 156 from scanner gamut 151 to printer gamut 153. Gamut-mapping transformations like those discussed above may be used to map colors like that for point 154 from scanner gamut 151 onto the boundary of printer gamut 153. Neither type of transformation is suitable for colors like that for point 158.

When input device 10 is presented with a color that is outside its gamut, the input device itself performs a gamut-mapping transformation that maps the color into its gamut. An example of such a transformation is shown in FIG. 9A where the color corresponding to point 158 is mapped to the color corresponding to point 159 on or near the boundary of scanner gamut 151. Because point 159 is inside printer gamut 153, a conventional gamut-mapping transformation is not required because a color-space transformation can accomplish the necessary mapping. The result of either mapping is an underutilization of that part of printer gamut 153 that is outside scanner gamut 151.

A compensation transformation according to the present invention provides a way to more fully utilize this portion of an output-device gamut.

C. Derivation of Compensation Transformation

An optimum compensation transformation for a color image reproduction system is device dependent. Preferred methods for deriving a compensation transformation take into account the characteristics of the particular input device 10 and output device 30 that are used in a given system.

Figure 10:
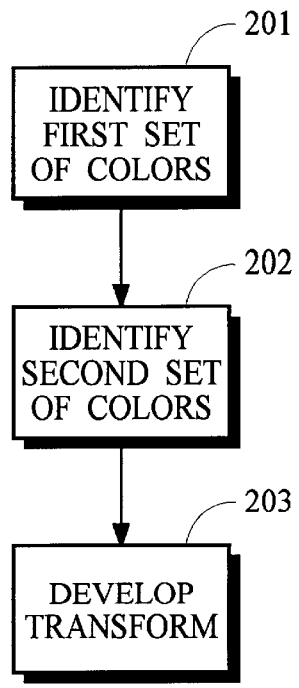
FIG. 10 is a flowchart illustrating steps in a method for deriving a compensation transformation.

One method that may be used to derive a compensation transformation is illustrated in FIG. 10. In this method, step 201 identifies one or more regions of color space for compensation by finding a first set of colors that are in the gamut of the output device but are not in the gamut of the input device. For ease of discussion, the term "input gamut" is used herein to refer to the gamut of the input device and the term "output gamut" is used herein to refer to the gamut of the output device. Step 202 identifies a second set of colors that are in the input gamut and in the output gamut, and step 203 develops a transformation that maps from the second set of colors into the first set of colors.

1. Identifying the First Set of Colors

The first set of colors are within a region of color space that would be underutilized by a color image reproduction system without benefit of the present invention. Because these colors are in the output gamut, they can be printed by output device 30; however, because these colors are not in the input gamut, they cannot be sensed by input device 10 and would not be reproduced by the system unless compensation is provided.

a) First Method

Figure 11A:
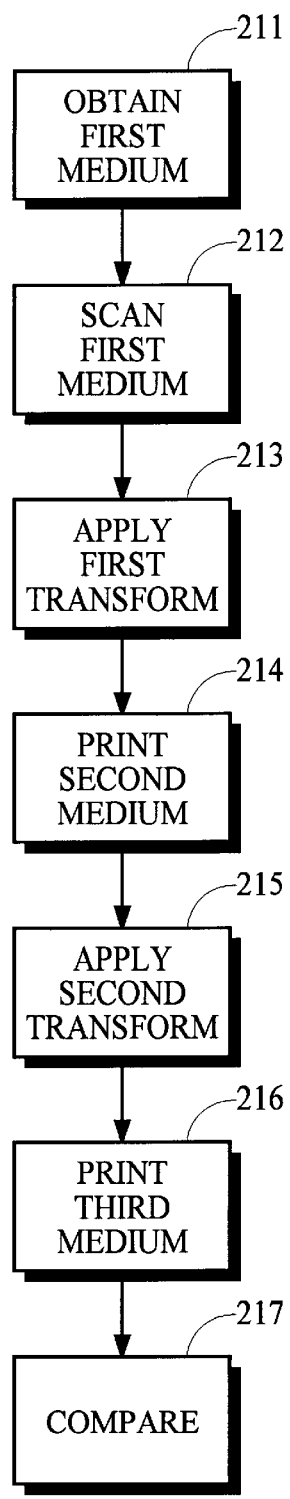
FIGS. 11A through 11C are flowcharts illustrating steps in several methods for identifying a first set of colors that are in the gamut of an output device but are not in the gamut of an input device.

The first set of colors may be identified in a variety of ways. The steps for one way is illustrated in FIG. 11A. Step 211 obtains a first medium such as a sheet of paper conveying a third set of colors having the same hue in a first range of chromaticity that equals or exceeds the range of chromaticity for that hue for the output gamut of output device 30. In one embodiment, a single hue is printed in a strip of colors that range from a minimum chromaticity to a maximum chromaticity. A preferred medium conveys strips for the hues red, magenta, green, yellow, blue and cyan, and the remaining steps are performed for each hue.

Step 212 uses input device 10 to scan the first medium and obtain first color coordinates representing the third set of colors. By definition, the first color coordinates are in the input gamut.

Step 213 applies a first color-space transformation to the first color coordinates as required to obtain second color coordinates in a suitable output-DDCS for subsequent printing. Step 214 uses output device 30 to print colors on a second medium in response to the second color coordinates. Depending on the gamut-mapping properties of input device 10 and the accuracy of the first color-space transformation, the hue of the colors that are printed on the second medium should be substantially the same as the hue of the third set of colors conveyed on the first medium. In one embodiment, a strip of colors are printed having a second range of chromaticity. This second range of chromaticity is generally expected to be less than the first range of chromaticity.

Step 215 applies a second color-space transformation to the first color coordinates to obtain third color coordinates in the output-DDCS. The second color-space transformation maps the first color coordinates into a larger range of chromaticity than does the first color-space transformation and may be obtained by modifying the first color-space transformation. Step 216 uses output device 30 to print colors on a third medium in response to the third color coordinates. Depending on the gamut-mapping properties of input device 10 and the accuracy of the second color-space transformation, the hue of the colors that are printed on the third medium should be substantially the same as the hue of the third set of colors conveyed on the first medium. In one embodiment, a strip of colors are printed having a third range of chromaticity. This third range of chromaticity is also generally expected to be less than the first range of chromaticity but it should not be less than the second range of chromaticity.

Step 217 compares the second and third ranges of chromaticity to determine whether the third range of chromaticity is greater than the second range of chromaticity. If it is greater, then the colors of extreme chromaticity that appear on the third medium but do not appear on the second medium are known to be in the output gamut but not in the input gamut. The comparison may be performed using a calibrated measuring device such as a spectral photometer or it can be done visually without the aid of instruments. If instruments are not used, the color-space coordinates of the first set of colors can be determined more easily if output device 30 is instructed to print the color-space coordinate values for a few of the colors that are printed on the media.

b) Second Method

Figure 11B:
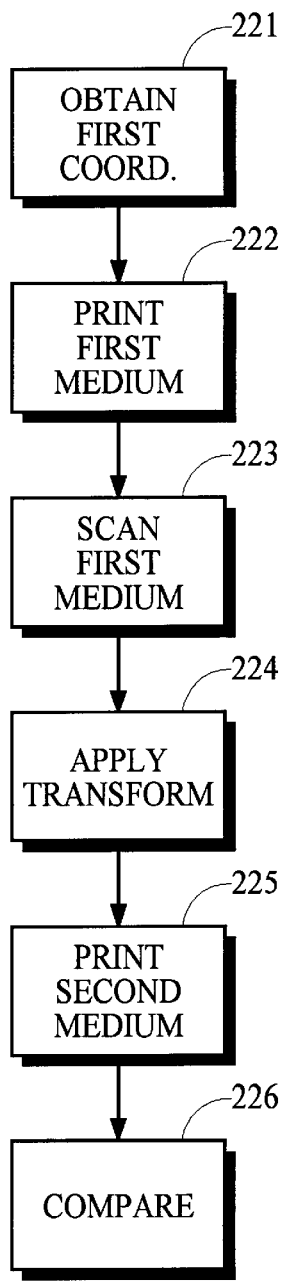

A second way to identify the first set of colors is illustrated in FIG. 11B. Step 221 obtains first color coordinates that represent a single hue in a range of chromaticity that equals or exceeds the range of chromaticity for that hue for the output gamut of output device 30. In one embodiment, color coordinates (c,m,y) in a CMY color space are generated that range in value from one extreme of a color space to the opposite extreme. In one embodiment, color coordinate values are expressed by 8-bit binary quantities having values that range from 0 to 255. One set of first color coordinates could represent a range of chromaticity for yellow, expressed as $\{(0,0,i)\}$ for $0 \leq i \leq 255$. In a preferred embodiment, the first color coordinates represent the maximum range of chromaticity for the hues cyan, red, magenta, green, yellow and blue, and the remaining steps are performed for each hue.

A color-space transformation may be applied to the first color coordinates as necessary to map the coordinates into a suitable output-DDCS for printing in step 222. This transformation is not required if the first color coordinates represent the desired colors in the output-DDCS. Step 222 prints colors on a first medium having a first range of chromaticity.

Step 223 uses input device 10 to scan the first medium and obtain second color coordinates. Step 224 applies a color-space transformation to the second color coordinates as required to obtain third color coordinates in the output-DDCS. Step 225 uses output device 30 to print colors on a second medium in response to the third color coordinates. Depending on the gamut-mapping properties of input device 10 and the accuracy of any color-space transformation applied in step 224, the hue of the colors that are printed on the second medium should be substantially the same as the hue of colors printed on the first medium. In one embodiment, a strip of colors are printed having a second range of chromaticity. This second range of chromaticity may be less than the first range of chromaticity.

Step 226 compares the first and second ranges of chromaticity to determine whether the first range of chromaticity is greater than the second range of chromaticity. If it is greater, then the colors of extreme chromaticity that appear on the first medium but do not appear on the second medium are known to be in the output gamut but not in the input gamut. The comparison may be performed using a calibrated measuring device such as a spectral photometer or it can be done visually without the aid of instruments. If instruments are not used, the color-space coordinates of the first set of colors can be determined more easily if output device 30 is instructed to print the color-space coordinate values for a few of the colors that are printed on the media.

c) Third Method

Figure 11C:
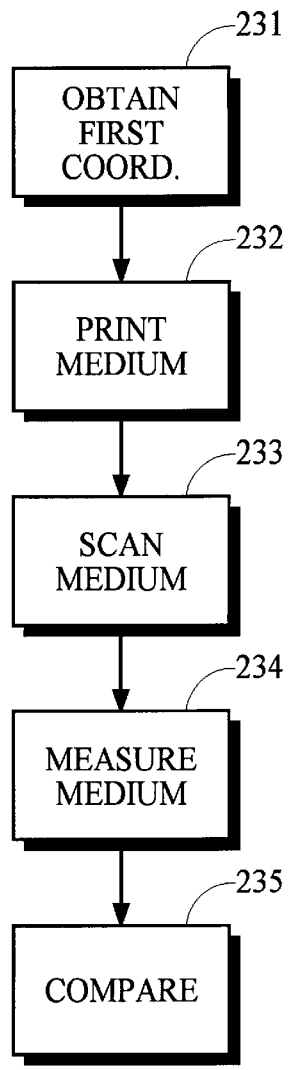

A third way to identify the first set of colors is illustrated in FIG. 11C. Steps 231 to 233 may be performed in the same manner as that described above for steps 221 to 223, respectively, using output device 30 to print colors on a medium in a first range of chromaticity and using input device 10 to scan the first medium and obtain second color coordinates having a second range of chromaticity. Step 233 may also apply a color-space transformation to obtain the second color coordinates in any desired color space. In preferred embodiments, a transformation is applied to obtain coordinates in some DICS.

Step 234 uses a calibrated scanning device such as a spectral photometer having a gamut larger than the gamut of input device 10 to measure the colors conveyed on the medium and obtain third color coordinates representing those colors in a third range of chromaticity. Preferably, the calibrated scanning device provides color coordinates in the same DICS mentioned above for step 233.

Step 235 compares the second and third ranges of chromaticity to determine whether the third range of chromaticity is greater than the second range of chromaticity. If the third range is greater, then the colors of extreme chromaticity that are represented in the set of third color coordinates that are not represented in the set of second color coordinates are known to be in the output gamut but not in the input gamut. The comparison may be performed numerically by analyzing coordinates in the DICS mentioned above. Alternatively, the comparison may be accomplished by mapping the second and third coordinates into a suitable output-DDCS, printing the colors corresponding to the mapped coordinates together with the coordinate values for a few of the colors, and visually inspecting the printed colors. A visual comparison may be facilitated by instructing output device 30 to print the color-space coordinate values for a few of the colors that are printed.

2. Identify the Second Set of Colors

Unlike the first set of colors, the second set of colors are in-gamut colors that can be reproduced by the color image reproduction system; they are within both the input gamut and the output gamut. The design of transformations for in-gamut colors in conventional systems seeks to preserve hue and chromaticity. The design of transformations for in-gamut colors in systems that incorporate the present invention seeks to distort the mapping accuracy for the second set of colors.

FIGS. 12A and 12B are schematic illustrations of the boundaries of hypothetical gamuts represented in CIE L*a*b* space similar to the illustrations of FIGS. 9A and 9B. Gamut 151 represents the input gamut of a hypothetical scanner and gamut 153 represents the output gamut of a hypothetical printer. Point 161 represents a color in the first set of colors that is within the output gamut but not in the input gamut. Points 162 and 163 represent colors that are within both gamuts. The closed lines immediately surrounding point 162 represents the boundaries of a region of color space in which a compensation transformation is to be applied; therefore, point 162 represents a color that is in the second set of colors and point 163 represents a color that is not within the second set of colors.

In a preferred embodiment of a system incorporating the present invention, the transformations that are applied to the color-space coordinates of points like point 163 that are outside the second set of colors will attempt to preserve hue and chromaticity; the transformations that are applied to the coordinates of points like point 162 that are within the second set of colors will distort luminance, hue and/or chromaticity so that some colors are mapped into the first set of colors.

The size of the region represented by the second set of points is chosen to balance two competing interests. On the one hand, the region should be small to limit the color-distorting effects of the compensation transformation. On the other hand, the region should be large so that the transition between compensated and uncompensated regions is not too abrupt. The size of this region can be determined empirically.

3. Develop Transformation

Having identified the second set of colors, the compensation transformation can be designed to map colors smoothly and more or less uniformly from a region of color space represented by the second set of colors into a region of color space represented by the union of the first and second sets of colors. Stated differently, some of the colors in the second set of colors are mapped to colors in the first set of colors. Remaining colors in the second set of colors are mapped to other colors in the second set of colors.

The compensation transformation may be carried out in essentially any color space. Ideally, the compensation transformation should preserve hue and luminance while changing only chromaticity, or at least minimize the change in hue and luminance. In principle, an ideal mapping of selected colors may be accomplished easily in CIE L*a*b* space by simple computations. Unfortunately, transformations implemented in CIE L*a*b* space generally require complex computations to prevent other colors from being mapped outside the output gamut. In contrast, transformations implemented in a CMYK color space, for example, can easily avoid mapping the other colors outside the output gamut but the preservation of hue and luminance is more difficult to achieve. Generally, transformations in CMYK space are preferred in systems having an output device 30 that uses CMYK colorants.

Compensation may be implemented by one-dimensional and multi-dimensional transformations. One-dimensional implementations are generally not preferred because it is usually very difficult to limit the mapping effects of the transformation to the desired second set of colors. Nevertheless, a description of a one-dimensional transformation is useful in understanding the operation of a multi-dimensional transformation.

a) One-Dimensional Transformation

One way for implementing a compensation transformation is illustrated by the block diagram shown in FIG. 13 in which controlling device 20 includes input-device map 21, output-device map 22, and compensation transformation 24 that is implemented by four independent scalers. In the embodiment shown, input-device map 21 transforms signals received from paths 12r, 12g and 12b, which represent colors in RGB space, into signals representing the colors in another color space such as CIE L*a*b* space. Output-device map 22 transforms these signals into signals that represent the colors in CMYK space. The choice and dimension of these color spaces are offered only as examples. The signal that conveys the cyan coordinate of each color is pass to scaler 24c, which scales or multiples that signal and passes the scaled result along path 31c to output device 30. Similarly, scalers 24m, 24y and 24k scale the signals representing the magenta, yellow and black coordinates, respectively, and passes the scaled results along paths 31m, 31y and 31k, as shown.

This embodiment implements a compensation transformation by scaling selected signals. For example, if the output gamut of output device 30 includes a significant range of colors in the yellow portion of the spectrum that are not included in the input gamut of input device 10, this condition can be compensated by having scaler 24y scale the yellow signal by an appropriate amount. Compensation can be provided for any of the other signals if desired by using appropriate scale factors in the other scalers.

Preferably, compensation is provided only for signals that represent hues having a chromaticity that satisfies a comparison with one or more thresholds. The thresholds correspond to the boundary of the second set of colors mentioned above. The size of the scaling factor is chosen to map the second set of colors into substantially the full range of colors represented by a union of the first and second sets of colors.

Figure 14:
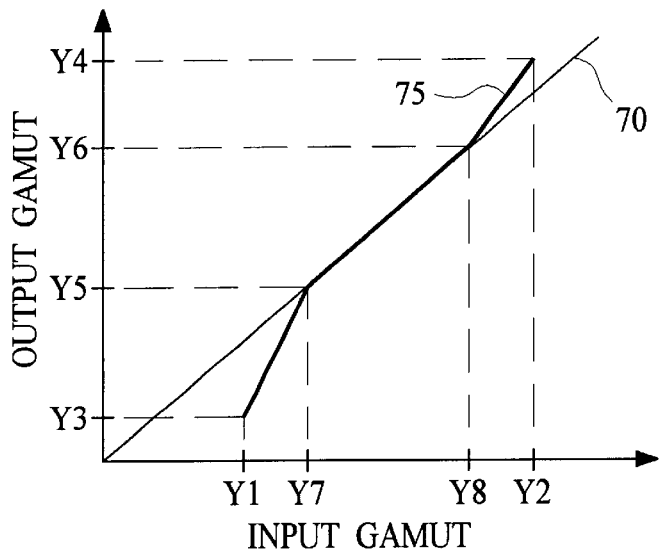
FIG. 14 is a graphical illustration of hypothetical one-dimensional color-space and compensation transformations.

FIG. 14 illustrates a one-dimensional mapping for yellow between hypothetical input and output gamuts. The input gamut for input device 10 includes colors of yellow hue within a range of chromaticity that extends from Y1 to Y2, and the output gamut for output device 30 includes colors of yellow hue within a range of chromaticity that extends from Y3 to Y4. In the example shown, the output gamut includes colors for low and high levels of chromaticity that are not included in the input gamut. The ideal mapping 70 between gamuts is assumed to be a linear function for illustrative clarity. Without compensation, the color image reproduction system maps scanned colors for printing into a range of chromaticity that extends from Y5 to Y6. The first set of colors discussed above are within the range of chromaticity from Y3 to Y5 and from Y6 to Y4. The second set of colors mentioned above are represented by the ranges of chromaticity from Y1 to Y7 and from Y8 to Y2. Having identified the first and second sets of colors, scale factors can be chosen to implement a piecewise-linear compensation transformation 75 that maps the second set of colors into the union of the first and second sets of colors as shown.

The scalers 24 may also be used to provide scaling for other purposes such as gamma correction or for improving the accuracy of the calibration transformations implemented by input-device map 21 and/or output-device map 23. As mentioned above, calibration transformations in many systems generally implement non-linear mapping functions by some form of linear interpolation. The accuracy of the interpolation can be improved if the color coordinates are first warped in a non-linear manner to obtain point coordinates in some linearized color space. This could be accomplished by scalers not shown in the figures. If this technique is used, scalers 24 can be used to reverse these warping effects to obtain point coordinates in the output-DDCS.

b) Multi-Dimensional Transformation

A second and preferred way for implementing a compensation transformation is by linear interpolation within a multi-dimensional LUT. Such compensation can be provided efficiently by altering output-device map 23 to provide compensation in addition to color-space mapping and/or gamut mapping.

Figure 15:
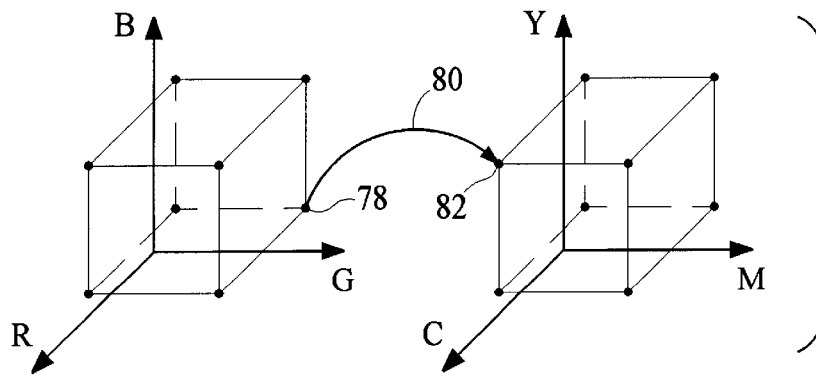
FIG. 15 is a graphical illustration of a hypothetical three-dimensional mapping between an RGB space and a CMY space.

FIG. 15 is a schematic illustration of a multi-dimensional transformation between two color spaces. According to mapping relationship 80 shown in the example, point 78 in RGB space corresponds to point 82 in CMY space. The illustration is intended to show a hypothetical mapping relationship between each vertex of the rectangular prism in RGB space and a respective vertex of the rectangular prism in CMY space. Each vertex corresponds to an entry in a three-dimensional LUT. As explained above, a mapping of intermediate points in RGB space can be obtained by interpolation of the LUT entries that correspond to the vertices in CMY space.

Figures 16A, 16B:
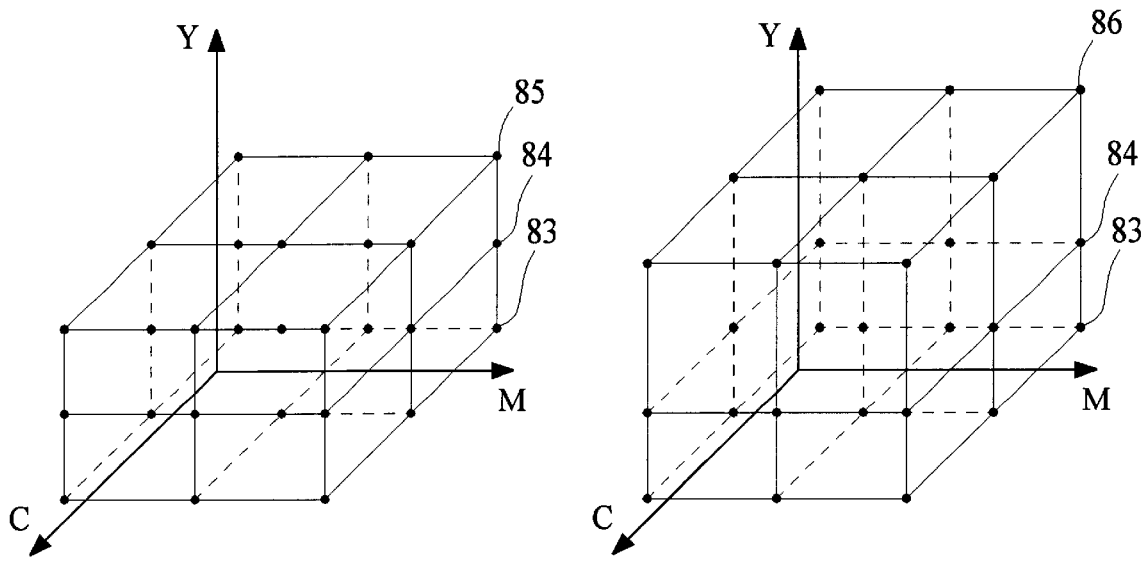
FIGS. 16A and 16B illustrate grids of points in CMY space that represent entries in a hypothetical lookup table and show how a compensation transformation may be implemented.

FIG. 16A illustrates a uniformly-spaced grid of points in CMY space representing a few entries in a LUT that implements a first color-space transformation intended to preserve luminance, hue and chromaticity. Point 83 represents a color that has lower chromaticity for yellow than does the color represented by point 84, which has lower chromaticity for yellow than does the color represented by point 85.

FIG. 16B illustrates another grid of points in CMY space representing a few entries in another LUT that implements a second color-space transformation. Unlike the first transformation, the second transformation distorts the yellow chromaticity of colors above a threshold C-M plane containing point 84. This is accomplished by essentially stretching that portion of the grid "above" the threshold C-M plane by a scaling factor.

The threshold C-M plane that contains point 84 represents a boundary between the second set of colors discussed above and the remainder of the input gamut. Colors that are represented by points at or below the threshold plane or, in other words, colors that have a yellow chromaticity less than or equal to the colors represented by points in the threshold plane, are not in the second set of colors. Colors that are in the second set of colors are mapped by a transformation that increases yellow chromaticity in a manner that is analogous to the one-dimensional transformation 75 shown in FIG. 14 and discussed above.

This type of LUT implementation is attractive because it does not require any additional computational or memory resources beyond that required for providing output-device map 23, and because it provides a smooth transition between a region of color space that is not mapped by a compensation transformations and an adjacent region or color space that is mapped by the compensation transformation.

D. System Configuration

In a preferred embodiment, a color image reproduction system provides facilities to derive a compensation transformation for new input and output devices, or to adjust the compensation transformation for changes in the operating characteristics of aging components. This may be accomplished in a variety of ways. Several ways for deriving a compensation transformation are discussed above in connection with FIGS. 10 and 11.

Another way derives a compensation transformation by determining the particular input and output devices connected to the system, consulting a library of prescribed gamut characteristics for those particular models to identify the first and second sets of colors, and selecting scaling factors to map the second set of colors into the union of the first and second sets of colors. The particular input and output devices may be identified by configuration signals that are provided by operator input or by the devices themselves like that done for so called "plug-and-play" installations.

Preferably, the compensation transformation is provided by modifying entries in a LUT that implements a calibration transformation like that for output-device map 23. The LUT for the calibration transformation can be stored on storage device 47 or in ROM or other non-volatile memory, for example.

What is claimed is:

1. A method for developing a compensation transformation for use in a color image reproduction system that comprises an input device having an input gamut and an output device having an output gamut, the method comprising:

identifying a first set of colors that are in the output gamut but are not in the input gamut;

identifying a second set of colors that are in the input gamut and in the output gamut; and developing the compensation transformation to enhance chromaticity of colors in the second set of colors by mapping the second set of colors into a union of the first and second sets of colors.

2. A method according to claim 1 that identifies the first set of colors by:

obtaining a first medium conveying a third set of colors in a first range of chromaticity;

scanning the first medium with the input device to obtain first color coordinates in the input gamut representing the third set of colors;

applying a first color-space transformation to obtain second color coordinates in response to the first color coordinates;

printing colors in a second range of chromaticity on a second medium in response to the second color coordinates;

applying a second color-space transformation to obtain third color coordinates in response to the first color coordinates;

printing colors in a third range of chromaticity on a third medium in response to the third color coordinates; and comparing the second and third ranges of chromaticity and identifying which of the colors in the third set of colors are also in the first set of colors.

3. A method according to claim 1 that identifies the first set of colors by:
   obtaining first color coordinates representing a third set of colors;
   printing colors in a first range of chromaticity on a first medium in response to the first color coordinates;
   scanning the medium with the input device to obtain second color coordinates in the input gamut;
   obtaining third color coordinates in response to the second color coordinates;
   printing colors in a second range of chromaticity on a second medium in response to the third color coordinates; and
   comparing the first and second ranges of chromaticity and identifying which of the colors in the third set of colors are also in the first set of colors.

4. A method according to claim 1 that identifies the first set of colors by:
   obtaining first color coordinates representing a third set of colors;
   printing colors in a first range of chromaticity on a first medium in response to the first color coordinates;
   scanning the medium with the input device to obtain second color coordinates in the input gamut representing colors in a second range of chromaticity;
   scanning the medium with a calibrated measuring device to obtain third color coordinates representing colors in a third range of chromaticity; and
   comparing the second and third ranges of chromaticity and identifying which of the colors in the third set of colors are also in the first set of colors.

5. A method for performing a compensation transformation in a color image reproduction system that comprises an input device having an input gamut and an output device having an output gamut, the method comprising:
   receiving an input signal representing color space coordinates of a first color that is in the input gamut and in the output gamut; and
   applying the compensation transformation to the input signal to generate an output signal representing color space coordinates of a second color that is in the output gamut but not in the input gamut.

6. A method according to claim 5 wherein the compensation transformation is applied to map the first color to the second color by scaling a color space coordinate of the first color.

7. A method according to claim 5 wherein the compensation transformation is applied to map the first color to the second color by interpolation of a multi-dimensional lookup table having entries representing colors that are in the output gamut but are not in the input gamut.

8. A method according to claim 5 that applies the compensation transformation to signals representing color space coordinates in the input gamut that are within a first region of color space to generate an output signal representing color space coordinates in the output gamut in a second region of color space, wherein substantially all colors that are represented in the intersection of the second region and the input gamut are also represented in the first region.

9. A method according to claim 5 that comprises:
   receiving configuration signals representing characteristics of the input gamut and the output gamut; and
   altering the compensation transformation according to the colors represented by color space coordinates in the output gamut that are not represented by color space coordinates in the input gamut.

10. A method according to claim 5 wherein a first set of colors are in the output gamut but not in the input gamut and a second set of colors are in the input gamut and in the output gamut, and wherein the compensation transformation maps colors from the second set of colors into a union of the first and second sets of colors.

11. An apparatus for performing a compensation transformation in a color image reproduction system that comprises an input device having an input gamut and an output device having an output gamut, the apparatus comprising:
   a terminal that receives an input signal representing color space coordinates of a first color that is in the input gamut and in the output gamut; and
   processing circuitry that applies the compensation transformation to the input signal to generate an output signal representing color space coordinates of a second color that is in the output gamut but not in the input gamut.

12. An apparatus according to claim 11 wherein the processing circuitry applies the compensation transformation to map the first color to the second color by scaling a color space coordinate of the first color.

13. An apparatus according to claim 11 wherein the processing circuitry applies the compensation transformation to map the first color to the second color by interpolation of a multi-dimensional lookup table having entries representing colors that are in the output gamut but are not in the input gamut.

14. An apparatus according to claim 11 wherein the processing circuitry applies the compensation transformation to signals representing color space coordinates in the input gamut that are within a first region of color space to generate an output signal representing color space coordinates in the output gamut in a second region of color space, wherein substantially all colors that are represented in the intersection of the second region and the input gamut are also represented in the first region.

15. An apparatus according to claim 11 that comprises a terminal to receive configuration signals representing characteristics of the input gamut and the output gamut, wherein processing circuitry alters the compensation transformation according to the colors represented by color space coordinates in the output gamut that are not represented by color space coordinates in the input gamut.

16. An apparatus according to claim 11 wherein a first set of colors are in the output gamut but not in the input gamut and a second set of colors are in the input gamut and in the output gamut, and wherein the compensation transformation maps colors from the second set of colors into a union of the first and second sets of colors.

17. A medium readable by a device embodying a program of instructions for execution by the device to perform a method for developing a compensation transformation for use in a color image reproduction system that comprises an input device having an input gamut and an output device having an output gamut, wherein the method comprises:
   identifying a first set of colors that are in the output gamut but are not in the input gamut,
   identifying a second set of colors that are in the input gamut and in the output gamut; and
   developing the compensation transformation to enhance chromaticity of colors in the second set of colors by mapping the second set of colors into a union of the first and second sets of colors.

18. A medium according to claim 17 wherein the method identifies the first set of colors by:
   obtaining a first medium conveying a third set of colors in a first range of chromaticity;
   scanning the first medium with the input device to obtain first color coordinates in the input gamut representing the third set of colors;
   applying a first color-space transformation to obtain second color coordinates in response to the first color coordinates;
   printing colors in a second range of chromaticity on a second medium in response to the second color coordinates;
   applying a second color-space transformation to obtain third color coordinates in response to the first color coordinates;
   printing colors in a third range of chromaticity on a third medium in response to the third color coordinates; and
   presenting the second and third ranges of chromaticity for comparison and identification of which colors in the third set of colors are also in the first set of colors.

19. A medium according to claim 17 wherein the method identifies the first set of colors by:
   obtaining first color coordinates representing a third set of colors;
   printing colors in a first range of chromaticity on a first medium in response to the first color coordinates;
   scanning the medium with the input device to obtain second color coordinates in the input gamut;
   obtaining third color coordinates in response to the second color coordinates;
   printing colors in a second range of chromaticity on a second medium in response to the third color coordinates; and
   presenting the first and second ranges of chromaticity for comparison and identification of which colors in the third set of colors are also in the first set of colors.

20. A medium according to claim 17 wherein the method identifies the first set of colors by:
   obtaining first color coordinates representing a third set of colors;
   printing colors in a first range of chromaticity on a first medium in response to the first color coordinates;
   scanning the medium with the input device to obtain second color coordinates in the input gamut representing colors in a second range of chromaticity;
   scanning the medium with a calibrated measuring device to obtain third color coordinates representing colors in a third range of chromaticity; and
   presenting the second and third ranges of chromaticity for comparison and identification of which colors in the third set of colors are also in the first set of colors.

21. A medium readable by a device embodying a program of instructions for execution by the device to perform a method for performing a compensation transformation in a color image reproduction system that comprises an input device having an input gamut and an output device having an output gamut, wherein the method comprises:
   receiving an input signal representing color space coordinates of a first color that is in the input gamut and in the output gamut; and
   applying the compensation transformation to the input signal to generate an output signal representing color space coordinates of a second color that is in the output gamut but not in the input gamut.

22. A medium according to claim 21 wherein the method applies the compensation transformation to map the first color to the second color by scaling a color space coordinate of the first color.

23. A medium according to claim 21 wherein the method applies the compensation transformation to map the first color to the second color by interpolation of a multi-dimensional lookup table having entries representing colors that are in the output gamut but are not in the input gamut.

24. A medium according to claim 21 wherein the method applies the compensation transformation to signals representing color space coordinates in the input gamut that are within a first region of color space to generate an output signal representing color space coordinates in the output gamut in a second region of color space, wherein substantially all colors that are represented in the intersection of the second region and the input gamut are also represented in the first region.

25. A medium according to claim 21 wherein the method comprises:
   receiving configuration signals representing characteristics of the input gamut and the output gamut; and
   altering the compensation transformation according to the colors represented by color space coordinates in the output gamut that are not represented by color space coordinates in the input gamut.

26. A medium according to claim 21 wherein a first set of colors are in the output gamut but not in the input gamut and a second set of colors are in the input gamut and in the output gamut, and wherein the method applies the compensation transformation to map colors from the second set of colors into a union of the first and second sets of colors.

* * * * *